July 28, 1925.
L. H. POMEROY
MOTOR VEHICLE FRAME
Filed Feb. 10, 1921
1,547,263
4 Sheets-Sheet 1
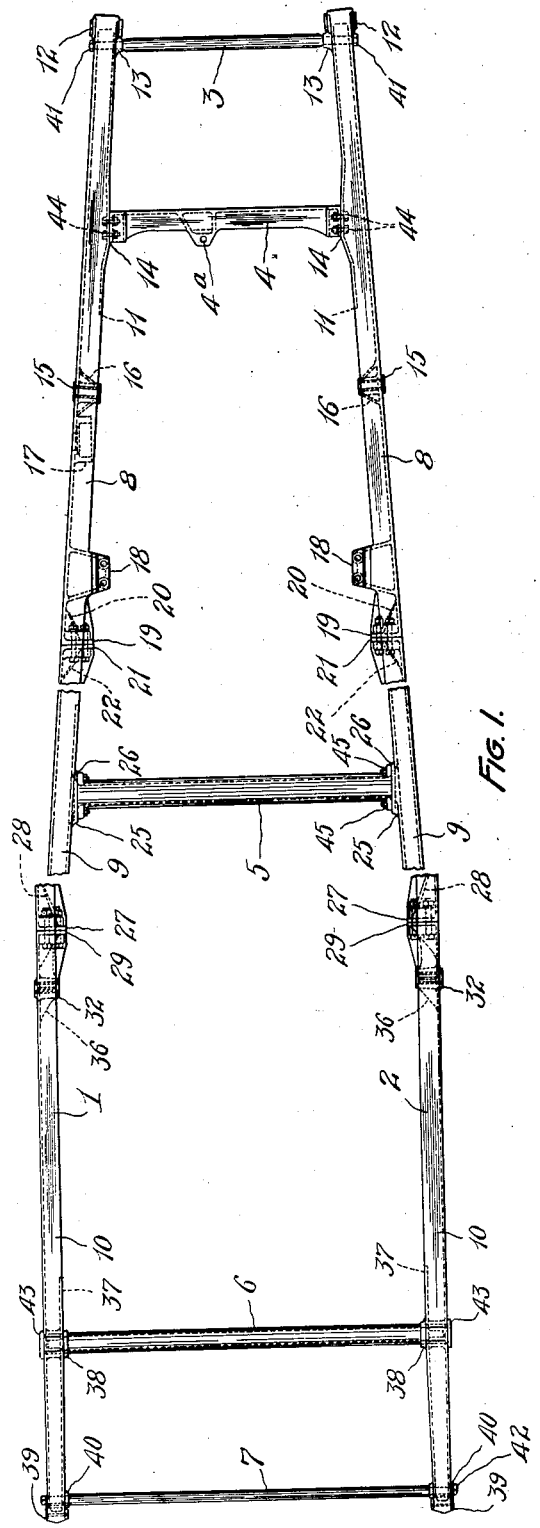
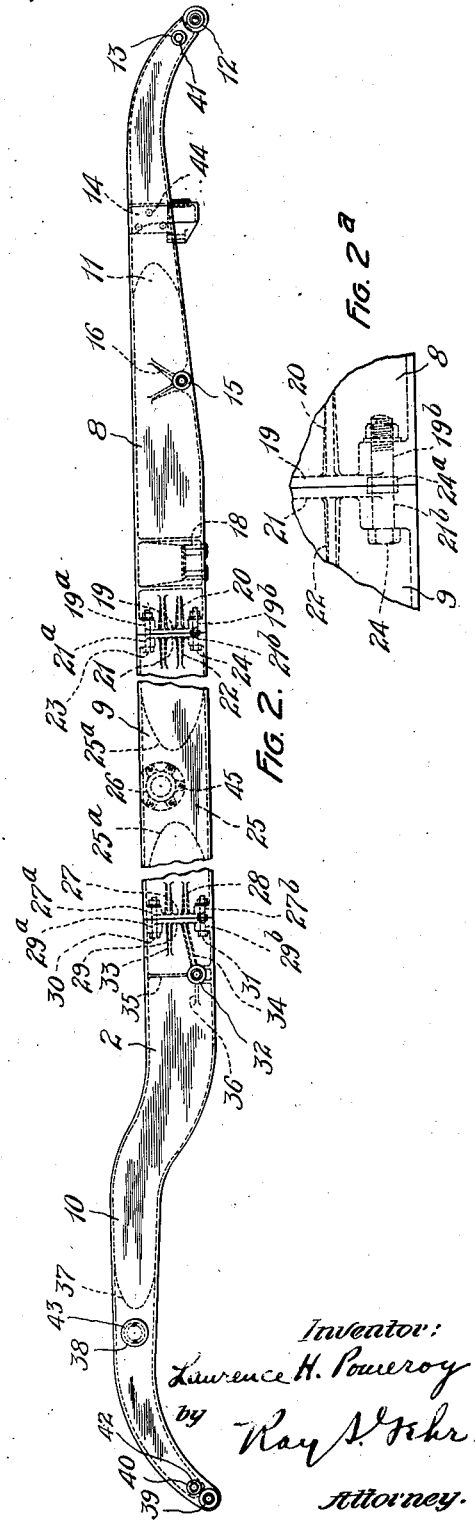
Inventor:
Lawrence H. Pomeroy
by Ray S. Fehr
Attorney.

July 28, 1925.
L. H. POMEROY
MOTOR VEHICLE FRAME
Filed Feb. 10, 1921
1,547,263
4 Sheets-Sheet 2
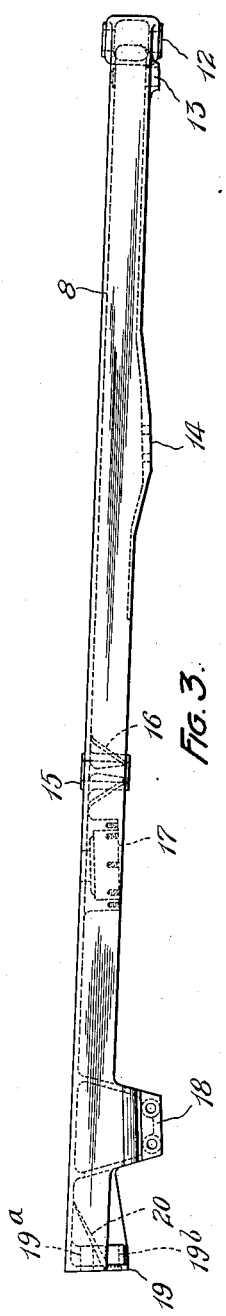
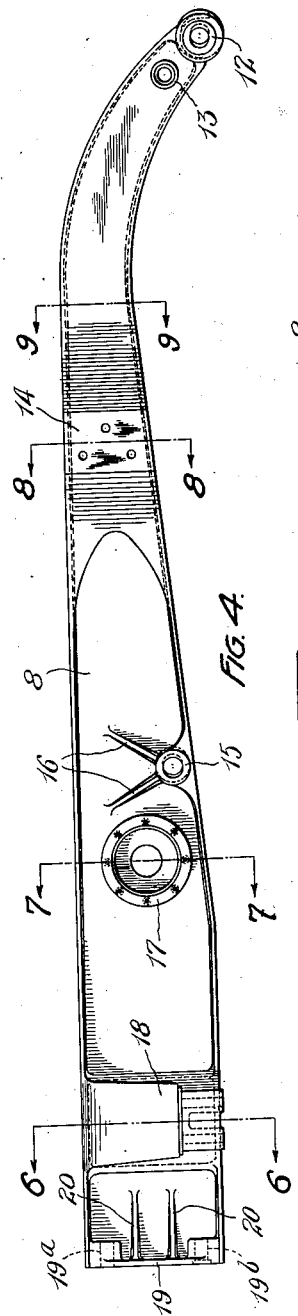
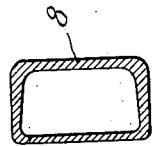
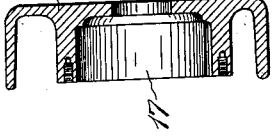
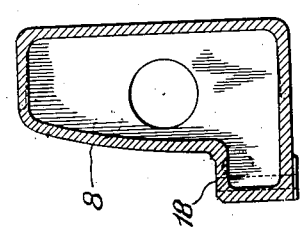
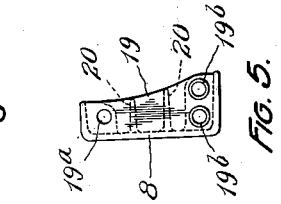
Inventor:
Laurence H. Pomeroy
by Ray J. Fisher
Attorney.

July 28, 1925.
L. H. POMEROY
1,547,263
MOTOR VEHICLE FRAME
Filed Feb. 10, 1921 4 Sheets-Sheet 3
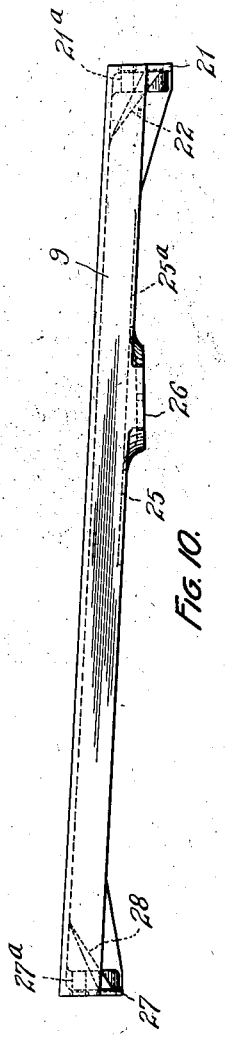
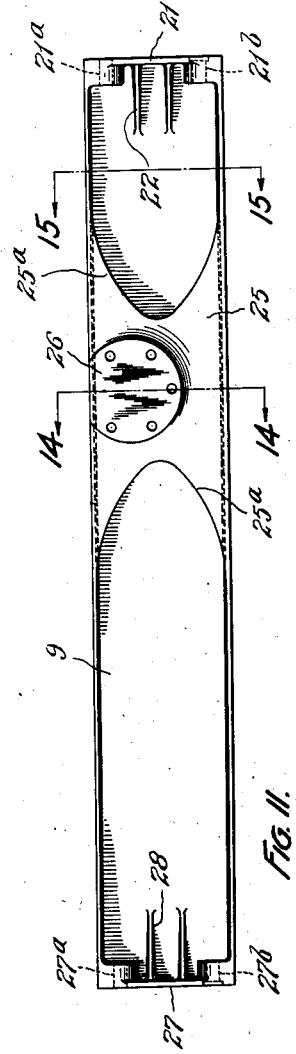
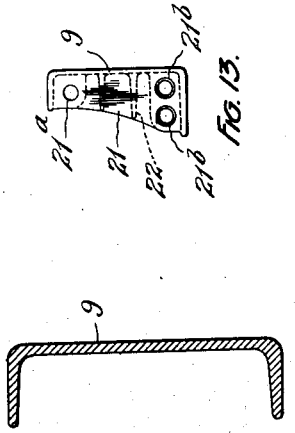
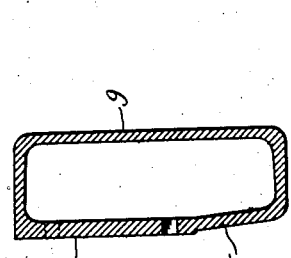
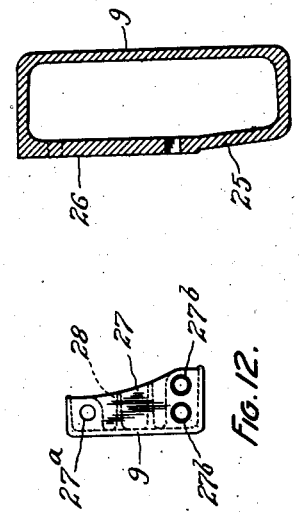
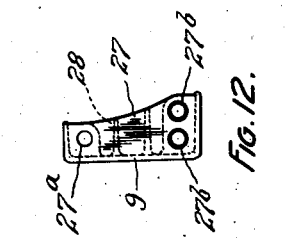

July 28, 1925.
L. H. POMEROY
MOTOR VEHICLE FRAME
Filed Feb. 10, 1921
1,547,263
4 Sheets-Sheet 4
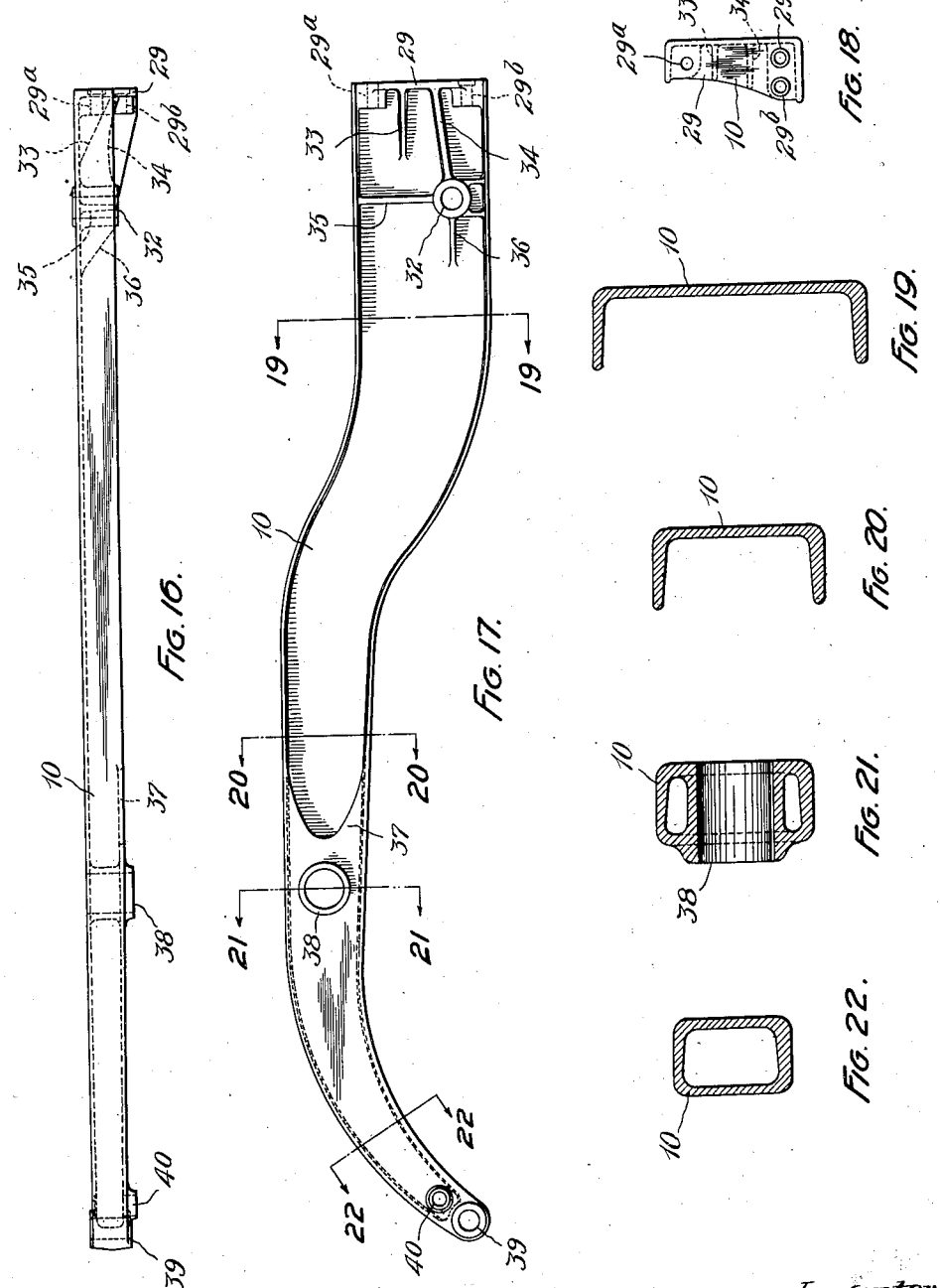

Patented July 28, 1925.

1,547,263

UNITED STATES PATENT OFFICE.

LAURENCE HENRY POMEROY, OF CLEVELAND, OHIO.

MOTOR-VEHICLE FRAME.

Application filed February 10, 1921. Serial No. 443,768.

*To all whom it may concern:*

Be it known that I, LAURENCE HENRY POMEROY, a subject of the King of Great Britain and Ireland, residing at Cleveland, in the county of Cuyahoga and State of Ohio, have invented certain new and useful Improvements in Motor-Vehicle Frames, of which the following is a specification, reference being had therein to the accompanying drawings.

The invention relates to improvements in chassis frames for motor vehicles.

One object of the invention is to reduce the weight of such frames in relation to their strength and rigidness.

A further object, ancillary to the first object, is to produce a frame in which the metal is disposed in accordance with the stresses to which the different parts are subjected in use.

Another object, which also is more or less ancillary to that first mentioned, is the production of a frame having fittings, such as spring horns, bosses and supporting brackets, made integral therewith, thereby reducing both the weight and the cost of the frame.

Another object of the invention is the provision of a form of construction that can successfully be cast of suitable light weight metals, such as aluminum or magnesium alloys.

Another object of the invention is the provision of a sectional form of construction that facilitates handling and machining as well as the casting of the frame.

Other objects, some of them incidental or ancillary to the foregoing, and the manner of realizing all of the various objects will appear in the following description, setting forth, in connection with the accompanying drawings, a preferred embodiment of the invention.

In the drawings, Figure 1 is a plan view of a preferred form of my improved frame, parts of the structure being broken away.

Fig. 2 is a side elevation of the same.

Fig. 2ª is an enlarged fragmentary side elevation of the lower part of one of the frame joints.

Fig. 3 is a plan view of the front section of the left side rail of the frame.

Fig. 4 is an inside elevation of said section.

Fig. 5 is a rear end elevation of said section.

Fig. 6 is an enlarged section on the line 6—6, Fig. 4.

Fig. 7 is an enlarged section on the line 7—7, Fig. 4.

Fig. 8 is an enlarged section on the line 8—8, Fig. 4.

Fig. 9 is an enlarged section on the line 9—9, Fig. 4.

Fig. 10 is a plan view of the middle section of the left side rail of the frame.

Fig. 11 is an inside elevation of said section.

Fig. 12 is a rear end elevation of said section.

Fig. 13 is a front end elevation of said section.

Fig. 14 is an enlarged section on the line 14—14, Fig. 11.

Fig. 15 is an enlarged section on the line 15—15, Fig. 11.

Fig. 16 is a plan view of the rear section of the left side rail of the frame.

Fig. 17 is an inside elevation of said section.

Fig. 18 is a front end elevation of said section.

Fig. 19 is an enlarged section on the line 19—19, Fig. 17.

Fig. 20 is an enlarged section on the line 20—20, Fig. 17.

Fig. 21 is an enlarged section on the line 21—21, Fig. 17.

Fig. 22 is an enlarged section on the line 22—22, Fig. 17.

Referring in detail to the construction illustrated, the frame comprises left and right side rails designated in their entireties by the numerals 1 and 2, respectively, these side rails being connected by transverse members 3, 4, 5, 6 and 7. Since the side rails are similar, except for the fact that they are made opposite, or right and left, and that the left rail has one feature not possessed by the right rail, a detailed description of the left rail will suffice for both.

The side rail is formed in three sections, namely, a front section 8, a middle section 9 and a rear section 10. Each of these sections is cast of a light weight metal, preferably a suitable aluminum alloy. Aluminum alloys of various compositions suitable for this purpose are now known and my invention, of course, is not limited to any particular metal. However, an alloy which I have found suitable for the purpose has the composition: copper, 3%; zinc, 7 to 8%; iron, 1%; balance aluminum. An alloy of this composition, in the sand cast state, has a tensile strength of about 28,000 pounds per sq. in. and an elongation of about 6%. This combination of comparatively high tensile strength and high ductility makes the metal well adapted for a structure that must sustain stresses such as those to which an automobile frame is subjected. In addition, the alloy has good casting and machining qualities. While, as stated above, the invention is not limited to this particular alloy, it should be noted that the alloy used should have an elongation, in the sand cast state, of not less than 3%; and of course it is desirable that it have as great tensile strength as possible.

The front frame section, as shown by Figs. 3 to 9, has its rear part cast with a channel cross section while its forward part is given a box cross section, the channel section merging gradually at 11 into the box section so that sudden variation in the cross-sectional area and the strength of the rail is avoided. At its front end, the section 8 is formed with an integral spring horn 12 which is suitably apertured to receive the spring shackle. Just back of the spring horn 12 the section is formed with an apertured boss 13 to receive the end of the transverse frame member 3. At 14, the inside wall of the section 8 is formed with a seat to receive the end of the transverse frame member 4. At 15, the section 8 is formed with an apertured boss to receive the shackle of the rear end of one of the front springs of the vehicle, the construction at these bosses being strengthened by ribs 16. 17 is a cylindrical boss cast integral with the section 8 adapted to serve as a support for a part of the steering gear of the machine. 18 is an engine supporting bracket cast integral with the section 8, the rail at this point being given a box section, as shown in Fig. 6, to afford adequate strength. At its rear end, the rail section 8 is formed with a transverse flange 19 which is strengthened by ribs 20 and provided at its top with a bolt aperture 19$^a$ and at its bottom with a pair of bolt apertures 19$^b$.

The middle section 9 of the left rail is formed for the most part with a channel cross section. At its front end, the section 9 is formed with a transverse flange 21 strengthened by ribs 22 and formed with bolt apertures 21$^a$ and 21$^b$ which register with the apertures 19$^a$ and 19$^b$, respectively, of the section 8. A bolt 23 in the apertures 19$^a$, 20$^a$ and a pair of bolts 24 in the apertures 19$^b$, 20$^b$ serve to rigidly connect the sections 8 and 9 together. The bolts 24 are preferably provided intermediate their ends with collars 24$^a$ which rest in countersinks formed in the apertures 19$^b$, 21$^b$. These collars serve to relieve the bolts in a large measure from shearing stresses. At 25, the section 9 is given added strength by being formed with a box cross section and the inside wall of this box section is formed with a seat 26 to receive the end of the transverse frame member 5. The box section 25 merges gradually at 25$^a$ with the channel sections. At its rear end, the rail section 9 is formed with a transverse flange 27 strengthened by ribs 28 and formed with a top bolt aperture 27$^a$ and a pair of bottom bolt apertures 27$^b$.

The rear section 10 of the rail is formed in its forward part with a channel cross section and has at its front end a transverse flange 29 formed with top and bottom bolt apertures 29$^a$ and 29$^b$ which register with apertures 27$^a$ and 27$^b$, respectively, to receive securing bolts 30 and 31, the bolts 31 being provided with shear-resisting collars, as in the case of bolts 24. Near the front end of the section 10, it is formed with an apertured boss 32 to receive the shackle of the front end of one of the rear springs of the vehicle. The section adjacent the flange 29 and the boss 32 is strengthened by ribs 33, 34, 35 and 36. The rear part of the rail section 10 is formed with a box cross section which merges gradually at 37 with the channel section. The box section is formed with an apertured boss 38 to receive the end of the transverse frame member 6. At its rear end, the rail section 10 is formed with a spring horn 39 and, adjacent said spring horn, with an apertured boss 40 to receive the end of the transverse frame member 7.

The transverse flanges 19, 21 and 27, 29 constitute continuous integral connections between the vertical web and the top and bottom flanges of their respective rail sections and consequently the bolted butt-end joints between the rail sections are exceedingly strong as well as compact and neat in appearance.

In addition to forming parts of the side rail with box sections, to afford added strength where desired, I make the bottom flange or wall of the rail thicker than the top flange or wall, as shown in the sectional views, the bottom flange being in tension, when the frame is loaded, whereas the top flange is in compression.

As above stated, the right rail 2 of the frame is made opposite to the left rail except that the cylindrical boss 17 of the left rail is omitted.

The transverse frame members 3 and 7 are in the form of round rods, which can be made either of light weight metal or of steel, and have their ends secured in the side rails by nuts 41 and 42, respectively. The transverse frame member 6 is in the form of a tube which also can be made either of light weight metal or of steel. It has its interiorly threaded ends secured in the side rails of the frame by threaded flanged plugs 43. The transverse frame member 4 is cast of light weight alloy similar to that used for the side rails of the frame and has its ends formed to fit the seats 14 of the side rails to which it is secured by bolts 44, 44. At 4ª, the member 4 is formed with an integral bracket to support the front end of the engine of the vehicle. The transverse member 5 is in the form of a tube with flanged ends which are fitted and secured to the seats 26 of the middle sections of the side rails by bolts 45, 45. This transverse member 5 is also cast of light weight alloy.

By forming the side rails of my improved frame in a plurality of sections, preferably three, the operations of casting and machining and the handling of the parts are very greatly facilitated. Also, with the rails divided into three sections the rail joints are so disposed as not to interfere with the necessary transverse frame members. At the same time, when the parts are properly fitted, assembled and connected, the resulting frame structure is exceedingly strong and rigid. I have found that it is possible to produce an aluminum alloy cast frame of my improved construction that has a weight approximately one-half that of a pressed steel frame of similar strength and rigidity. The production of a frame equally as strong and rigid as a steel frame but only half as heavy and at a cost low enough to compete with the steel frame, is a result due to the combined contributions of several diverse but essential factors. Of these factors, the more readily appreciated are the low specific gravity of the metal employed, the fact that, with cast side rails, it is possible to distribute the constituent metal closely in accordance with the stresses to which the different parts of the structure are subjected in use, and also the fact that superfluous metal is eliminated by the formation of fittings such as engine-supporting brackets, spring horns, bosses and the like integral with the main frame members. But these factors alone are not enough; there must be present also certain combined characteristics that have comparatively recently become available in some of the light-weight alloys, namely, high tensile strength, high ductility or elongation and good high speed machining qualities.

No one of these latter characteristics alone will suffice. Thus the light-weight metal may have high tensile strength, say 25,000 pounds to 30,000 pounds per square inch, and good machining qualities, but if its ductility in the cast state is low it would be necessary in the production of an automobile frame to employ so high a factor of safety that little would be gained in weight over the steel frame and the increased cost of the metal would be prohibitive from the standpoint of commercial production. But with high ductility it is feasible to use a relatively low factor of safety, the strains incident to abnormally high stresses that may rarely occur being accommodated by plastic deformation of the metal without danger of fracture.

Similarly, if high elongation be secured at the expense of the tensile strength of the cast metal, the weight and cost would rise to a prohibitive point.

Finally, the previously mentioned advantages incident to casting combined with the advantages of high tensile strength and high elongation will not bring practical commercial success if the cast frame parts are not susceptible of accurate machine finishing at the high cutting speeds possible with the light-weight alloys. Some of the light-weight alloys do not machine well because of their tendency to tear or crumble under the cutting tool, but alloys are now available, such as that above described, which have very good rapid machining qualities combined with ample strength and ductility. The saving which I effect in the machine finishing of my frame parts, in comparison with the corresponding costs in producing steel frames, is an essential factor contributing very materially to the commercial feasibility of my improved frame.

I am aware that it has previously been proposed to make vehicle frames of cast metal, particularly of cast bronze, but the impossibility of producing such a frame in commercial competition with pressed steel frames, will be apparent from what has been stated above.

While I have set forth the preferred form of construction, it is to be understood that there can be variation in various respects of the construction illustrated in carrying out the invention, the scope of the invention being indicated by the appended claims.

What I claim is:

1. A chassis frame for motor vehicles having side rails composed of a plurality of cast sections rigidly joined together and including front sections having integral spring horns and engine-supporting brackets, said cast rail sections being formed of metal of low specific gravity in comparison with iron and an elongation in the sand cast state of not less than 3 per cent.

2. A chassis frame for motor vehicles having side rails composed of a plurality of cast sections rigidly joined together and including rear sections having integral spring horns and front sections having integral spring horns and engine-supporting brackets, said cast rail sections being formed of metal of low specific gravity in comparison with iron and an elongation in the sand cast state of not less than 3 per cent.

3. In a chassis frame for motor vehicles, the combination of longitudinal side rails and transverse members connecting them, said rails having front, middle and rear sections rigidly joined together end to end and cast of metal of low specific gravity in comparison with iron and an elongation in the sand cast state of not less than 3 per cent and the front and rear sections being cast with integral spring horns and bosses and the front sections having integral engine-supporting brackets.

4. In a chassis frame for motor vehicles, the combination of longitudinal side rails and transverse members connecting them, each of said rails comprising a plurality of sections cast of metal of low specific gravity in comparison with iron, joined together end to end and formed at their joined ends with main webs, top and bottom flanges and abutting transverse flanges each of which latter constitutes a continuous integral connection between the vertical web and top and bottom flanges of its section, and bolts extending through holes in said transverse flanges and constituting the sole means of securing the abutting rail sections together.

5. A chassis frame for motor vehicles, comprising in combination side rails each of which has front, middle and rear sections cast of metal of low specific gravity in comparison with iron and rigidly joined together end to end, and transverse frame members connecting the side rails.

6. A chassis frame for motor vehicles comprising in combination side rails each of which has front, middle and rear sections cast of metal of low specific gravity in comparison with iron and rigidly joined together end to end, and transverse frame members connecting each pair of corresponding rail sections together.

7. A chassis frame for motor vehicles having cast side rails formed with channel cross-sections except in certain parts, including the end parts of said rails, which end parts are formed with box cross-sections and tapered vertically toward the ends of the rails.

8. A chassis frame for motor vehicles having in combination cast side rails formed with channel cross-sections, except in certain parts, including the end parts and middle parts of said rails, which are formed with box cross-sections, the said end parts being tapered vertically toward the ends of the rails, and transverse frame members connecting corresponding box sections of the said side rails.

9. A chassis frame for motor vehicles having cast metal side rails made in part with cross-sections of channel form and in part with cross-sections of box form, the channel sections merging gradually into the box sections.

10. A chassis frame for motor vehicles, comprising in combination side rails each of which has a plurality of sections cast of metal of low specific gravity in comparison with iron and rigidly joined together end to end, and transverse frame members rigidly connecting the side rails.

11. A chassis frame for motor vehicles, comprising in combination side rails each of which has a plurality of sections cast of metal of low specific gravity in comparison with iron and rigidly joined together end to end, said rails having spring horns and bosses and engine supporting brackets integrally cast therewith, and transverse frame members rigidly connecting the side rails.

In testimony whereof, I hereunto affix my signature.

LAURENCE HENRY POMEROY.